Nov. 10, 1964  H. A. LOCKWOOD  3,156,350
PLASTIC CAPSULE
Filed June 20, 1963
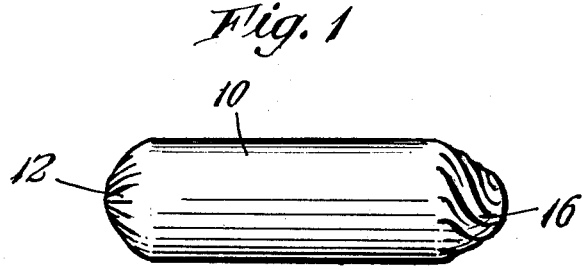
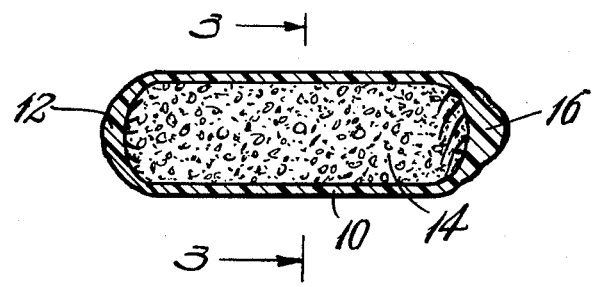
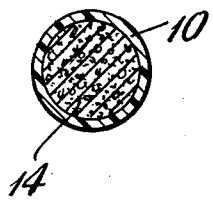
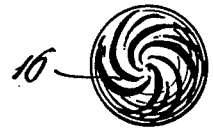
INVENTOR.
Harry A. Lockwood
BY
AGENT

United States Patent Office 3,156,350
Patented Nov. 10, 1964

3,156,350
PLASTIC CAPSULE
Harry A. Lockwood, Westport, Conn. (% DriAire Inc., 26 Fitch St., East Norwalk, Conn.)
Filed June 20, 1963, Ser. No. 289,317
1 Claim. (Cl. 206—46)

This invention relates to small capsules, and more particularly to one-piece plastic capsules of the type intended to hold granular, powdered and like substances.

An object of the invention is to provide a novel and improved plastic capsule for holding or containing powdered, granular or other dry substances, which capsule is constituted of a single piece of material and is so organized as to be especially resistant to breakage or opening, particularly at its ends, whereby it securely retains the contents.

Another object of the invention is to provide an improved one-piece plastic capsule as above set forth, which is formed of a section of plastic tubing with closed-in fused ends constituted to have added thickness whereby they are especially strong and resistant to breakage or opening.

A feature of the invention resides in the provision of an improved plastic capsule as characterized, wherein the closed-in fused ends are quickly and economically formed by simple equipment, with the tubing section either empty or else filled with the desired material.

Another object of the invention is to provide a plastic capsule in accordance with the foregoing, which is economical to fabricate, to fill and to close.

Other features and advantages will hereinafter appear.

In the drawings accompanying this specification, similar characters of reference are used to designate like components throughout the several views, in which.

FIG. 1 is a side elevational view of an improved plastic capsule as provided by the invention.

FIG. 2 is a longitudinal axial sectional view of the capsule of FIG. 1.

FIG. 3 is a transverse section taken on the line 3—3 of FIG. 2.

FIG. 4 is an end elevational view of either end of the capsule.

Referring to the figures, the improved and strengthened plastic capsule as provided herein comprises a single piece of plastic all portions of which are integral with each other. The capsule has a tubular body 10 shown as being in the form of a cylinder. While a cylindrical shape is at present preferred, it should be understood that the body 10 may have other tubular configurations, as for example that comprising a square cross section, or an oval section, etc.

Each capsule is advantageously formed from a short length of open-ended tubular plastic stock of thermoplastic characteristic, such as acetate or the like. A short piece of the plastic stock is cut off from a source of supply comprising a long length, to provide a blank which is open at both ends. The relatively short cut-off length or blank of plastic tubing may be placed on a suitable holder, as for example a round mandrel, and held so that the outer end extends a short distance beyond the tip of the mandrel.

A heated tool such as a die having a tapered cavity is advanced against the said end of the tube, causing it to melt and flow around the tip of the mandrel. The heated die is then retracted after it has completely closed the end of the tubing about the mandrel tip. The formed tubing section is then removed from the mandrel.

Referring to FIGS. 1 and 2, the thickened end 12 of the capsule is shown as having been formed in this manner. In accordance with the invention, the shape of the mandrel tip and of the cavity in the heated forming head are so developed that the closed-in fused plastic substance forms a concavo-convex end wall or closure which has an appreciably greater thickness than that of the cylindrical side wall 10. Also, the closing-in process is carried out in such a manner that the end wall which is formed is not completely flattened or compressed to such an extent that all irregularities are removed. Instead, the advancing movement of the heated die head is closely controlled and the head is withdrawn prior to any appreciable flattening or compressing of the formed end wall. As a consequence, the end wall 12 is not perfectly smooth but instead has undulations or irregularities, in addition to exhibiting a greater thickness. Such undulations are somewhat in the nature of wrinkles as seen in FIG. 4, and in conjunction with the greater thickness of the end wall provide, by the invention, a strengthening effect whereby the capsule is not likely to be easily deformed or ruptured at the formed ends.

Upon completion of the strengthened end 12 in the above manner, the capsule may be filled in any suitable manner with granular or powdered dry material, indicated at 14. The remaining open end of the capsule is thereafter closed as indicated at 16 so as to provide additional strength in the manner of the closure 12. That is, the end wall 16 also has an increased thickness, as well as spiral undulations or wrinkles. The ends 12 and 16 are so formed by the fusing as to comprise inner and outer twisted configurations respectively at their inside and outside surfaces, said inner and outer configurations at each individual end having generally matching shapes whereby the ends are constituted as undulating walls of irregular thickness, to effect greater strength by their shapes.

A preferred method of closing the second end of the capsule to provide the end wall 16 is as follows: A heated tool such as a die having a tapered cavity is advanced upon the open end of the capsule after the filling of the same. As the heated die is advanced it may have a slight turning movement. Upon engagement with the edges of the open end of the plastic, the die will fuse and close-in the said edges and adjoining portions, causing a flow of the plastic material. The slight turning movement which the die has facilitates this operation, and when the end wall 16 is fully formed the turning die head is withdrawn.

Preferably the extent of fusing and forming of the end portions to form the closure 16 is controlled in such a manner that the capsule end has a bulbous configuration, and that the inturned stock completely closes the end, resulting in the thickened closure formation 16 with wrinkles or undulations of somewhat spiral configuration. The wrinkles or undulations are clearly depicted in FIG. 4.

By proper control of the heat of the forming die head to maintain a moderate temperature, as well as control of the axial advance and turning of the head, the thickened end closures 12, 16 may be readily formed without difficulty and in such a manner as to completely close the capsule body 10 so as to prevent loss of the granular or powdered contents thereof.

As mentioned above, the increased thickness of the end closures 12, 16 in conjunction with the wrinkles or undulations which exist, provide a strengthened structure at the two ends of the body 10 by which there is effectively prevented any collapse or failure at these points. Instead, the end closures as thus formed have a strengthening effect on the capsule body 10, thereby producing a relatively durable product.

It will now be understood from the foregoing that I have provided an improved thermoplastic capsule structure which, by virtue of its thickened end closure formations in conjunction with an undulating or wrinkled configuration, has additional strength to enable it to resist breakage to a marked degree.

While one particular shape or configuration of capsule has been illustrated and described herein, the invention is not limited to this particular embodiment but instead the scope of the invention is defined more properly by the appended claim.

I claim:

A wholly one-piece and wholly rigid permanently sealed capsule comprising a tubular plastic body having integral, closed, rigid and self-supporting fused ends, the wall thickness of the ends being in general appreciably greater than the wall thickness of the sides of the body to provide added strength and rigidity at the ends for minimizing failure and breakage of the same, said ends being so formed by the fusing as to comprise inner and outer twisted configurations respectively at their inside and outside surfaces, said inner and outer configurations at each individual end having generally matching shapes whereby the ends are constituted as undulating walls which have a non-uniform, irregular thickness, said end walls being of generally rounded and blunt contour devoid of sharp or thin protuberances, thereby to effect an increased strength due to shape.

References Cited in the file of this patent

UNITED STATES PATENTS

| | | |
|---|---|---|
| 1,053,492 | Hadfield | Feb. 18, 1913 |
| 2,009,511 | Nydegger | July 30, 1935 |
| 2,125,385 | MacLean | Aug. 2, 1938 |
| 2,549,644 | Silverman | Apr. 17, 1951 |
| 2,587,515 | Parish | Feb. 26, 1952 |
| 2,619,228 | Long | Nov. 25, 1952 |
| 2,656,657 | Bartle | Oct. 27, 1953 |